Aug. 5, 1924.  L. A. M. CORSET  1,504,025
LIQUID LEVEL GAUGE
Original Filed June 25, 1921   2 Sheets-Sheet 1
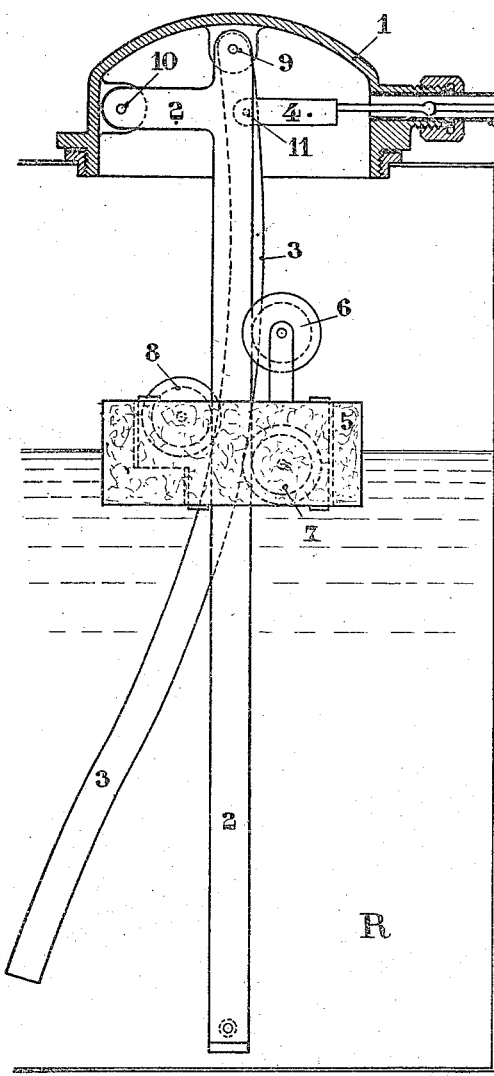
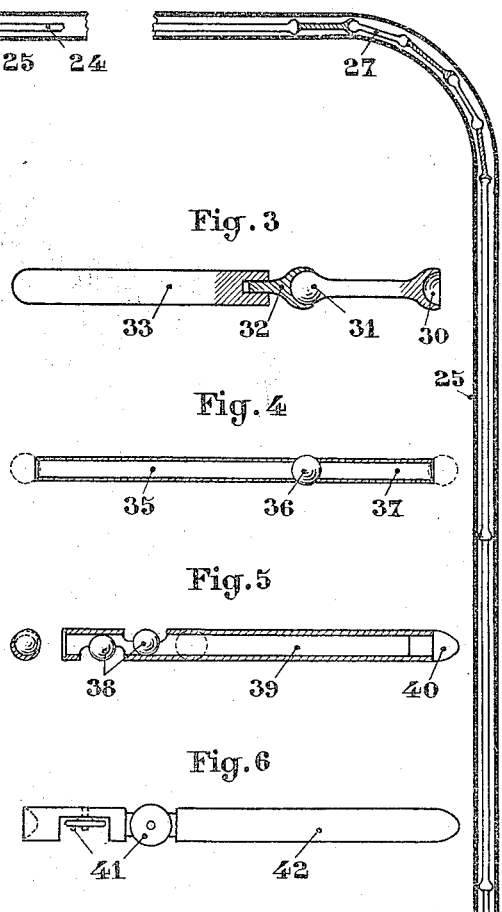
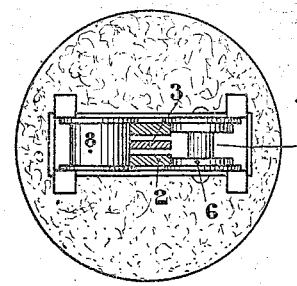
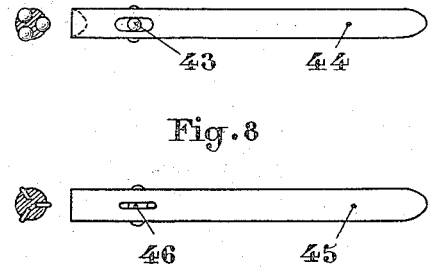

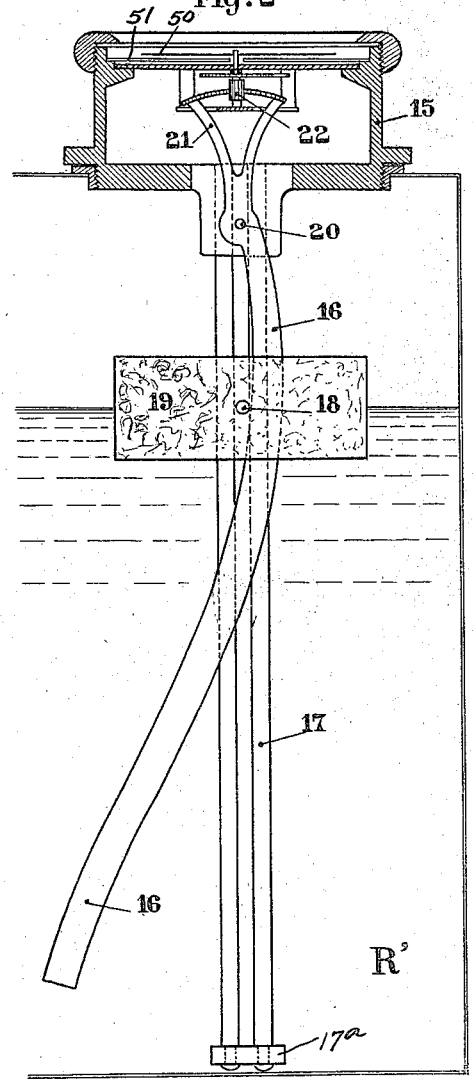

Patented Aug. 5, 1924.

1,504,025

UNITED STATES PATENT OFFICE.

LUCIEN ALFRED MAURICE CORSET, OF PARIS, FRANCE.

LIQUID-LEVEL GAUGE.

Application filed June 25, 1921, Serial No. 480,493. Renewed December 20, 1923.

*To all whom it may concern:*

Be it known that I, LUCIEN ALFRED MAURICE CORSET, a citizen of the French Republic, and resident of 29 Boulevard de Grenelle, Paris, France, have invented certain new and useful Improvements in Liquid-Level Gauges, of which the following is a specification.

The present invention relates to an apparatus adapted to indicate at a distance, the level or the quantity of liquid contained in a reservoir. The essential feature of the invention is the provision of a lever of well defined geometrical form according to the shape and size of the reservoir whose liquid level is to be indicated and which lever is actuated by a float which is slidably mounted on and supported by rods secured to the reservoir by means of a chambered support.

The movement of the float is transmitted either directly to an indicator mounted on the chambered support or to an indicator on a distant support by means of movable rods or sliders of suitable shape and which are adapted to be moved inside a tube.

Examples of construction according to the invention are shown in the accompanying drawings wherein:—

Figure 1 shows a system operated by a lever and float arranged in a reservoir R and means for transmitting the movements to a distance.

Figure 1ª is an inverted plan of the float shown in Fig. 1.

Figure 2 shows a form of a lever and float arranged in a reservoir R' which has the indicating mechanism mounted directly thereon, this system being of a simpler construction to the preceding in view of the absence of means for transmitting the movements to a distance.

Figure 2ª is an inverted plan of the float shown in Fig. 2.

Figures 3, 4, 5, 6, 7 and 8 show other forms of sliders of which any suitable number may be connected together.

From Figure 2 it will be seen that the operating system is composed of a float 19 traversed by a pin 18 which slides freely from top to bottom or from the bottom to the top between two pairs of rods 17 connected together at their lower ends by a plate 17ª and rigidly secured at their upper ends to a dial casing 15 screwed into the reservoir R'. Between the two pairs of rods 17 and in a vertical plane at right angles to that of the pin 18 is arranged an oscillating lever 16 pivoting on a pin 20. The lever 16 is of such a shape that its angular movements are proportional to the variations in volume of the liquid. For example, in the accompanying drawings the curvature is such as is necessary for a cylindrical reservoir with a horizontal axis.

In the case of a reservoir of which the horizontal section is constant the lever 16 will have the shape of a half parabola, of which the summit is disposed at 20 and of which one of the branches is the free lower extremity of this lever 16. The angular movements of the lever 16 are transmitted to a pinion 22 by means of a curved toothed sector 21 integral with the lever 16.

On the shaft of the pinion is mounted a pointer 50 moving in front of a dial 51.

The system shown in Figure 1 is based upon the same principle of the lever having a well defined geometrical shape.

In view of the variations in level of the liquid in the reservoir R the float 5 is moved vertically along rods 2 being guided by guide rollers 6, 7 and 8. The roller 6 rolls only on the rods 2 and is provided with a wide groove 6ª so as to prevent it from contacting with the back of the lever 3. The roller 8 plays a more important part than the rollers 6 and 7 as it rolls both on the rods 2 and the lever 3 which latter is adapted to be moved to the right when the float descends and to the left when the float rises.

The flat rods 2 are connected and secured rigidly for example by means of two rivets or screws 9 and 10 to the chambered support 1 while the lever 3 oscillates on the pivot 9. A small connector 4 hinged at 11 to the lever 3 receives the various movements of the lever 3 and transmits them to the sliders 24, 27 which slide in the tube 25 and these displacements communicate by the usual means of toothed sectors and pinions or other means to a pointer moving over a graduated dial (not shown).

It may here be mentioned that the degree of oscillation of the lever 3 being small the linear displacement of the connector 4 are proportional to the angular movements of the lever 3 which, in view of its shape, as hereinbefore described, are themselves proportional to the variation in volume of the liquid contained in the reservoir. For this reason the dial of the receiving apparatus is provided with equi-distant graduations even if the reservoir is a horizontal cylinder so that these graduations may be provided in advance. This is very important in the manufacture of large quantities and has also the advantage of facilitating the reading of the figures indicated. This advantage is also present in the apparatus shown in Figure 2.

In order to appreciate the advantages of the present invention it is necessary to examine the portions which can be objected to in known systems of a similar type.

The friction due to the weight of the sliders or movable members is not very important, but this is not the case in respect of the friction produced by the lateral reactions which it is difficult to avoid in consequence of the play which it is necessary to provide between the interior wall of the tube and the moving members without which the least flattening of the tube in consequence of shock would stop the operation of the whole apparatus.

The friction due to the lateral reactions hereinbefore indicated is obviously proportional to the number of points of contact.

With balls or short small cylinders therefore the total friction is considerable and almost entirely removes any practical use of systems which employ this type of movable members either in the form of balls or cylinders as the balls hardly roll.

The length of the rod 33 which may for example be 50 to 100 times its diameter has for its object to reduce the total friction which is obviously proportional to the number of points of contact. Thus the friction for a slider of 50 diameters is about one-fiftieth that produced in the known apparatus which consisted for example of placing 50 balls in contact with one another. If the cylinders are elongated and approximately of uniform diameter with the interior diameter of the tube the least curvature or distortion of the tube in consequence of stretching may easily stop the whole transmission.

This explanation may be passed to the study of the improvements of the transmission forming the subject of the present invention.

The long sliders are in two pieces 32 and 33 of which one 32 is of larger diameter than the member 33 and is composed of metal or other material capable of sliding easily in the tube 25. The other member 33 is of metal or any other material sufficiently rigid whose frictional coefficient with the tube is relatively small but whose coefficient of expansion should be such that the total expansion of all the sliders will be the same as that of the tube which contains them. For example if the tube 25 is of copper the part 32 of the slider is of steel which expands less than the copper, while the part 33 may be of brass or aluminum which expands more than copper; the part 33 thus serves to compensate for the expansion.

This feature is of great importance for the following reasons; the total friction being in reality sufficiently great in this type of transmission, no matter how well constructed, it is thus necessary to provide a sufficient motive effort to overcome the friction. Although the actual available motive effort is in the present case limited and defined by the product of the weight of the float and its movement, it is important to utilize it to the best advantage, and if a pushing effort is desired in the transmission it is necessary to reduce the space passed over according to a fundamental principle of mechanics. It is therefore necessary to reduce to a minimum these causes which may vary the relative importance of this displacement, that is to say the length, the contraction or the expansion of the sliders.

The lengthening of the movable part of the transmission may be produced by the action of transverse shocks if the front part of the slider deviates from the rear part of the preceding one. This may occur when the front part of the slider is conical, the same as the point of a nail, and engages in the rear part of the preceding slider provided with a hollow cone of larger size than the former, important variations occur, when the tube is subjected to repeated shocks when mounted on an automobile for example. Again variations of the efforts due to the weights of the horizontal sliders produce a minimum dislocation of each of their points at the expense of the accuracy of the indications transmitted. According to the present invention however the parts of the sliders which come into contact form a hinge of which the very free jointing opposes any transverse displacement and to variations resulting therefrom.

The remarks made above also apply to the contraction of the sliders. This contraction cannot be made in practice by sinking the parts 32 into the part 33 as the joining is effected by shock of which the effort is much greater than that of which the transmission is exposed. In operation the effort is of a nature rather static, relatively to the preceding. With pointed ends there is the risk of flattening or at least a wear of the ends in consequence of the small contact surfaces, even if the point is made in the same way as the part 32 of a harder metal and this wear may cause considerable variations in the indications of the apparatus. In the case of the shape of the slider shown in Figure 3 however the surface of contact in consequence of the hinge is sufficiently large to resist sinking and this permits of avoiding the necessity of using a pointed head of hard metal.

The compensation for expansion as already stated is obtained by the choice of of the material forming the rod 33 and it is practically easy to compensate for expansion so as to avoid any injurious action. It may be mentioned that the conditions of friction require a different material for the tube 25 and the frictional part 30 and 32 of the sliders, compensation for expansion however can only be obtained if the material of which the rod 33 is made is different to that of the tube 25.

The sliders employed at the bends are provided with a spherical head and a hinge which is slightly different from that of the sliders 32, 33. The hinge 30 has the advantage of affording to the bends a smaller length for the same effective length of the slider than the point and hollow cone employed in the known system and for which the angles of the point and the corresponding hollow cone have a limit which it is difficult to exceed in practice. The advantages of the different forms of sliders 30, 31, 32, 33 have thus been defined but the present invention also includes other types of sliders which will be defined hereinafter.

Figure 4 shows two sliders between which is freely placed a ball which slides in the principal tube 25.

Figure 5 shows a long and tubular slider 39 provided with three grooves arranged at 120 degrees in which are disposed three balls 38 which slightly project beyond the outer cylindrical surface of the slider and which, as the length of the grooves forms a bearing therefor, can roll on the inner surface of the tubular slider and on the adjacent inner surface of the transmitting tube 25. By using or omitting the head 40 this slider can be combined with short sliders 30, 31 or the slider 37 to which is connected the ball 36.

Figure 6 shows a long plain slider 42 provided with two rollers 41 placed on right angles to one another and adapted to roll in the interior of the transmission tube 25.

Figure 7 shows a long and plain slider 44 of which the three grooves arranged at 120 degrees serve as a guide way for three balls 43 slightly projecting beyond the outer surface of the slider and adapted to roll at the same time on the bottom of the grooves and on the inner wall of the transmission tube 25.

Figure 8 shows a long and plain slider 45 which is a modification of the one just described in that the balls are replaced by small rollers rolling in a groove which is straighter than in the preceding case.

Having thus described my invention what I claim as new and desire to secure by Letters Patent is:—

1. A liquid level gauge comprising in combination with a tank and a float operable therein, of a chambered support on said tank, rods fixed in said support to extend perpendicularly into the tank, a curved lever pivoted to said support intermediate said rods, said float having an opening through which the rods and lever freely pass, one or more rollers mounted on said float to impinge on one side of said rods, another roller mounted on the float to impinge on the opposite side of the rods and also on the curved lever, an indicating device, and means for transmitting movement of the curved lever to the indicating device.

2. A device for indicating the quantity of liquid contained in a reservoir, comprising a chambered support secured to the upper wall of said reservoir, a plurality of spaced rods fixedly secured to said support, a curved lever pivotally mounted in said support in a position of stable equilibrium, to extend downwardly between said rods, a float having a substantially centrally located aperture in which said rods and lever operate, means carried by said float to engage said rods and lever to hold said float against lateral movement with respect to said rods, and to transmit vertical movement of said float to lateral movement of said lever, an indicating device, and means for transmitting the movement of said lever to said indicating device.

3. A device for indicating the quantity of liquid contained in a reservoir comprising a chambered support secured to the upper wall of said reservoir, a plurality of spaced rods fixedly secured to said support, a curved lever pivotally secured to said support and extending between said rods, and a float adapted to rise and fall with the liquid in said reservoir and having a substantially central aperture through which said rods and lever extend, said float being provided with means located within the aperture to engage said rods and lever adapted to cause that portion of the lever within said aperture to be brought into substantially transverse alignment with said rods, an indicating device, and means to transmit the movements of said lever to said indicating device.

M. CORSET.